3,155,702
STEREOISOMERS AND THE RACEMATE OF BUTANE - 1,2,3,4 - TETROL-1,4-DI - (METHANESULFONATE)
Peter Werner Feit, Kongens Lyngby, Copenhagen, Denmark, assignor to Løvens Kemiske Fabrik Ved A. Kongsted, Ballerup, Denmark, a firm
No Drawing. Filed Feb. 21, 1961, Ser. No. 90,657
Claims priority, application Great Britain Feb. 22, 1960
1 Claim. (Cl. 260—456)

This application is a continuation-in-part of my copending prior application Serial No. 89,103 filed February 14, 1961, which has been abandoned during the period of prosecution of this present application.

This invention relates to the stereo-isomers and the racemates of butane-1,2,3,4-tetrol-1,4-di-(methanesulfonate) having the following formula:

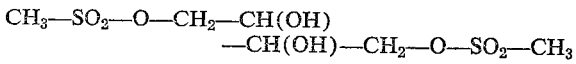
$$—CH(OH)—CH_2—O—SO_2—CH_3$$

The above compound, the stereo-isomers and racemates of which are involved herein, might equally well, or perhaps even better, be designated as butane-1,2,3,4-tetrahydroxy-1,4-di-(methanesulfonate).

In accordance with the commonly accepted nomenclature for butanetetrols the two optically active isomers and the racemate are hereinafter designated D-threitol-1,4-di-(methanesulfonate), L-threitol-1,4-di-(methanesulfonate), and DL-threitol-1,4-di-(methanesulfonate), respectively, and the meso-isomer erythritol-1,4-(di-methanesulfonate). These hitherto unknown substances are active against leukaemia.

The substances of the invention can be produced by reacting the corresponding isomer of 1,4-dibromobutane-2,3-diol with silver methanesulfonate.

EXAMPLE 1

*DL-Threitol-1,4-Di-(Methanesulfonate)*

12.4 g. DL-1,4-di-bromobutane-2,3-diol were dissolved in 45 ml. of anhydrous acetonitrile, 30 g. of silver methanesulfonate were added, and the mixture was boiled for one hour under reflux. Thereafter, the silver bromide was separated from the hot mixture by filtration, and the filtrate evaporated to dryness in vacuo. The residue was triturated without heating with acetone which dissolved the desired substance, but left the excess of silver methanesulfonate undissolved. The latter substance was filtered off, and the desired substance was obtained by removing the acetone from the filtrate by evaporation in vacuo. The crude product was recrystallized from ethanol, dissolved in acetone and precipitated with ether. The melting point of the purified product was 100–100.5° C.

EXAMPLE 2

*Erythritol-1,4-Di-(Methanesulfonate)*

Meso-1,4-dibromobutane-2,3-diol was reacted with silver methanesulfonate, and the reaction product isolated and purified as described in Example 1. Thereby, the desired substance was obtained with a melting point of 120.5–121° C.

EXAMPLE 3

*D-Threitol-1,4-Di-(Methanesulfonate)*

D-1,4-dibromobutane-2,3-diol was reacted with silver methanesulfonate, and the reaction product isolated and purified as described in Example 1. Thereby, the desired substance was obtained with a melting point of 100–101° C., and $(\alpha)_D^{20}=5.5°$ (c.=2, in acetone).

EXAMPLE 4

*L-Threitol-1,4-Di-(Methanesulfonate)*

L-1,4-dibromobutane-2,3-diol was reacted with silver methanesulfonate, and the reaction product isolated and purified as described in Example 1. Thereby the desired substance was obtained with a melting point of 100–101° C., and $(\alpha)_D^{20}=-5.3°$ (c.=2, in acetone).

On page 104, left column, second paragraph of cancer chemotherapy reports, December 10, 1960, issued by Cancer Chemotherapy National Service Center, it is stated that L-threitol-1,4-di-(methanesulfonate) is "markedly superior to Myleran for the treatment of Fischer rats with the Dunning leukemia."

I claim:
L-threitol-1,4-di-(methanesulfonate).

References Cited in the file of this patent

Montgomery et al.: Nature (British), 164, 672–3 (1949).

Carlson et al.: Proc. Soc. for Exptl. Biol. and Medicine, 85, 211–13 (1954).